United States Patent [19]

Holleron, Jr.

[11] Patent Number: 4,563,016

[45] Date of Patent: Jan. 7, 1986

[54] REMOVABLE AND FOLDABLE STAND FOR BICYCLES

[76] Inventor: William K. Holleron, Jr., 2331 Cades Cove, Spring, Tex. 77373

[21] Appl. No.: 583,952

[22] Filed: Feb. 27, 1984

[51] Int. Cl.⁴ .............................................. B62H 1/02
[52] U.S. Cl. ..................................... 280/293; 280/301
[58] Field of Search ............... 280/293, 295, 296, 298, 280/299, 300, 301, 302, 303, 304

[56] References Cited

U.S. PATENT DOCUMENTS 456,347  7/1891  Taylor ................................ 280/298
1,517,808  12/1924  Strniste ............................... 280/302

FOREIGN PATENT DOCUMENTS 222675  7/1942  Switzerland ....................... 280/293
11425  of 1902  United Kingdom ............... 280/304

Primary Examiner—John A. Pekar
Attorney, Agent, or Firm—Neal J. Mosely

[57] ABSTRACT

A removable and foldable stand for bicycles comprises two pivotally connected elongated rectangular members each having a flat portion and an angularly bent end which is provided with a hexagonal opening to receive the axle nut of the bicycle wheel. A push button latch locks the two rectangular members in an aligned straightened position, or a nested folded position. Alternatively, the bent end portions are provided with a rotatable lock nut which may be threaded onto the exposed threads of the wheel axle. When not in use, the stand may be removed and folded compactly to be carried in the pocket of the rider, or conveniently stored in a small space.

17 Claims, 6 Drawing Figures

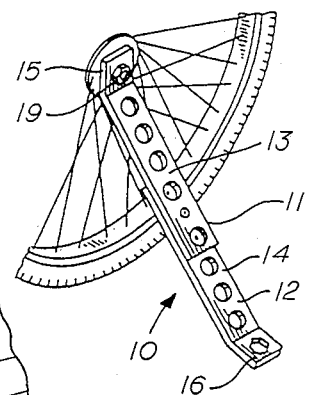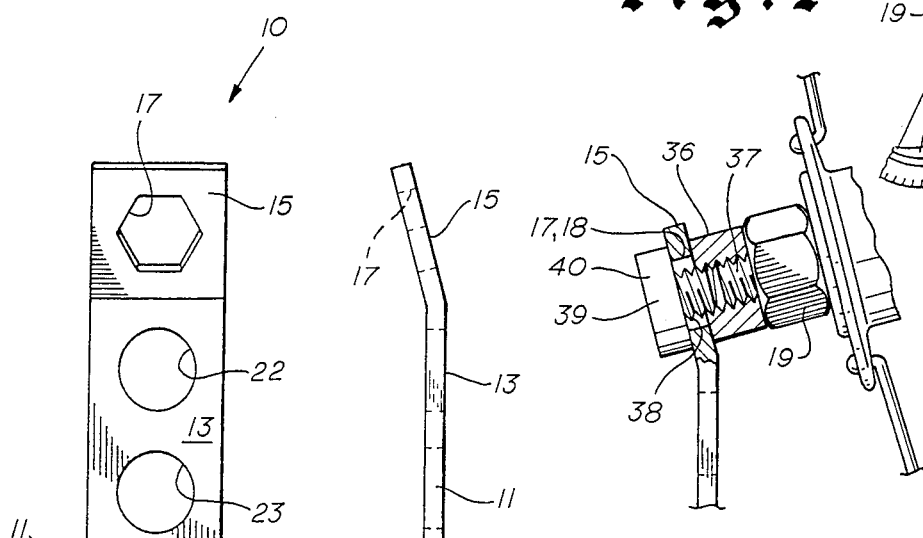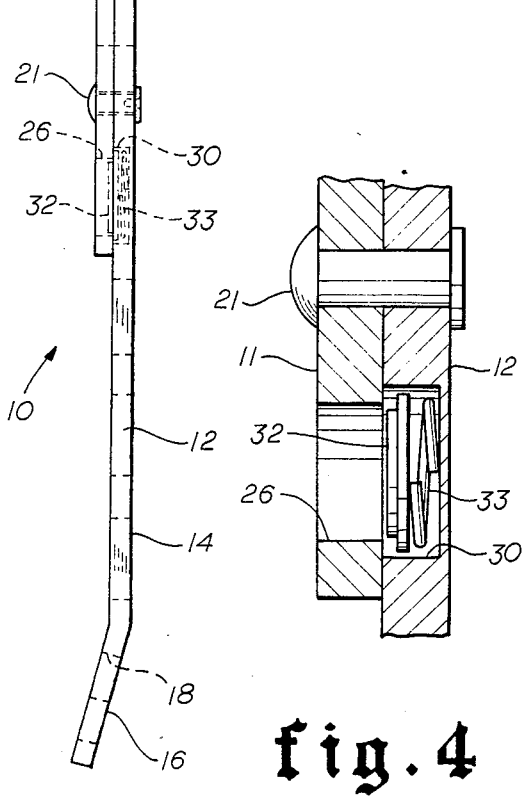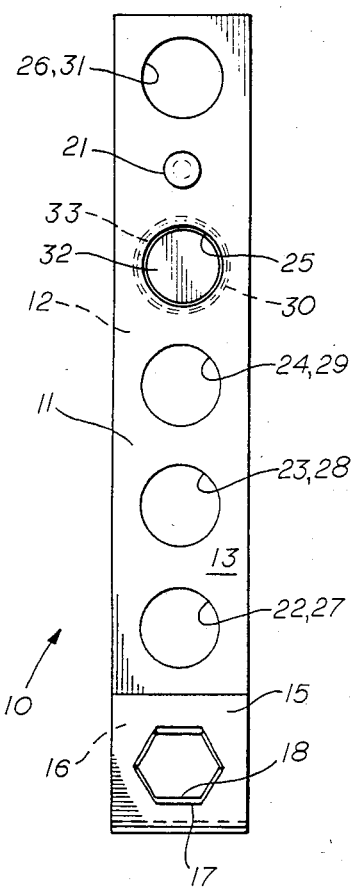

REMOVABLE AND FOLDABLE STAND FOR BICYCLES

BACKGROUND OF THE INVENTION

1. Field of the Invention

This invention relates to bicycle supports, and more particularly to a removable and foldable stand for bicycles which may be locked in an extended position for attachment to the axle of a bicycle for support thereof and easily removed and folded into a compact nested position to be carried in the pocket of the rider.

2. Brief Description of the Prior Art

Bicycle motocross racing is a popular sport which utilizes small, light weight bicycles known as a "BMX" bicycle. This same light weight BMX type of bicycle is also a very popular commercial design because of its inherent style and handling characteristics. The BMX bicycles are customarily striped of all non-essential parts, such as a kick stand, which would add weight or present a danger to the rider. In some instances even the extended ends of the axles are cut off to prevent them from protruding beyond the retaining nut. The lightweight materials used in the frame, pedals, sprockets, and spokes of these bicycles make them vulnerable to damage when left lying on the ground or supported on some other object.

Bicycle stands and supports are known in the art. There are several patents which disclose various bicycle stands and support devices.

Fry, U.S. Pat. No. 292,163 discloses a portable bicycle support consisting of a base piece having a semitubular notch to accept the wheel of a bicycle, and two pivotal telescoping adjustable rods extending upwardly therefrom to cradle the hub of the wheel.

Marks, U.S. Pat. No. 506,600 discloses a removable bicycle support consisting of two inclined legs connected at their top ends by a bow spring which impinges the step of a bicycle.

Longbottom, U.S. Pat. No. 747,449 discloses a bicycle support comprising a brace which is inserted between the rear stays of the frame and which has projections to engage the underside of the stays. When not in use, the brace is attached to the bicycle by an elastic cord looped around the seat post. When the brace is used to support the bicycle, the brace is pulled down and tipped at an angle with the projections resting on the rear stays.

Ellis, U.S. Pat. No. 850,527 discloses a bicycle support comprising a socket plate secured to the seat post of the bicycle frame. Angular downward opening sockets are provided on the socket plate to receive a tubular brace which supports the bicycle.

Cook, U.S. Pat. No. 1,227,390 discloses a bicycle attachment or strut, comprising a bar having a transverse recess near its upper end to receive the under portion of one of the arms of the rear frame fork of the bicycle. The contiguous extremity of the bar is curved away from the recess to pass over and removably engage the upper portion of the other arm of the fork.

The prior art in general, and none of these patents in particular, disclose a removable and foldable stand for bicycles which may be locked in an extended position for attachment to the axle of a bicycle for support thereof and easily removed and folded into a compact nested position to be carried in the pocket of the rider.

SUMMARY OF THE INVENTION

It is therefore an object of the present invention to provide a stand for bicycles which may be attached and removed easily and quickly without the use of tools.

Another object of this invention is to provide a stand for bicycles which is extendable into a rigid and sturdy support and may be folded to a compact size to be carried in the pocket of the rider.

Another object of the invention is to provide a stand for bicycles which is of simple and economical construction.

Another object of the invention is to provide a stand for bicycles which is light in weight and attractive in appearance.

Another object of the invention is to provide a stand which is lightweight and attractive in appearance and particularly adapted for use with BMX bicycles.

Other objects of the invention will become apparent from time to time throughout the specification and claims as hereinafter related.

The above noted objects and other objects of the invention are accomplished by a removable and foldable stand for bicycles comprising two pivotally connected elongated rectangular members which may be locked in an extended position for attachment the the axle of a bicycle for support thereof and easily removed and folded into a compact nested position to be carried in the pocket of the rider.

BRIEF DESCRIPTION OF THE DRAWINGS

FIG. 1 is a perspective drawing of a portion of the rear wheel of a bicycle having the stand in accordance with the present invention attached thereto.

FIG. 2 is a view in front elevation of the bicycle stand locked in its extended position.

FIG. 3 is a view in side elevation of the stand for bicycles locked in its extended position.

FIG. 4 is a side cross sectional view of a portion of the stand showing the pivot and lock mechanisms.

FIG. 5 is a view in front elevation of the stand in its folded position.

FIG. 6 is a fragmentary side view, partially in section, of an alternate attachment means for the stand for bicycles.

DESCRIPTION OF THE PREFERRED EMBODIMENT

Referring to the drawings by numerals of reference, there is shown a preferred removable and foldable stand 10 for bicycles. The stand 10 comprises two elongated rectangular members 11 and 12, having a flat straight portions 13 and 14, and angularly bent end portions 15 and 16.

The bent end portions 15 and 16 are provided with hexagonal openings 17 and 18 of sufficient size to fit snugly onto the axle nut 19 of the rear bicycle wheel 20. (FIG. 1) Each of the angularly bent ends 15 and 16 form a combined angle sufficient to support the weight of the bicycle in a substantially vertical position.

The flat straight portions 13 and 14 of the rectangular members 11 and 12 are overlapped and movably pinned at a short distance from each end by a pivot pin 21. The length of the rectangular members 11 and 12 and location of the pivot pin 21 is such that when they are pivoted and folded into their nested position, the folded length is approximately one half that of the extended position.

The flat straight portion 13 of the member 11 is provided with longitudinally spaced apart circular openings 22, 23, 24, 25, and 26. The flat straight portion 14 of the member 12 is provided with longitudinally spaced apart circular openings 27, 28, 29, and 31. Flat straight portion 14 has a circular recess 30, slightly larger than the several openings, positioned between openings 29 and 31 which aligns with opening 26 when open and with opening 31 when closed. When in the folded position, the openings in members 11 and 12 are substantially aligned. The stand is preferably made of aluminum for lightness of weight and the openings 22-31 further reduce the weight of the member and provide an attractive appearance.

A circular plug 32 has a loose fit in the recess 30 and is larger than the openings 26 and 31. Plug 32 has a front portion having a diameter slightly less than openings 26 and 31 and operable to fit therein as a lock. A coil spring 33 is positioned in recess 30 behind plug 32 to urge the same into opening 26 or 31 when aligned therewith. The plug 32 is in alignment with the opening 30 in the extended position and snaps into that opening to lock the stand in an open position. When in the folded position, the plug 32 is in alignment with the opening 31 and snaps into that opening to lock the stand in a folded position.

To fold or unfold the stand 10, the plug 32 is pressed out of the opening 26 or 31 by the thumb of the user sufficient to permit sideward movement between the members 11 and 12.

FIG. 6 shows an alternative means of attaching the stand 10 by the provision of a threaded lock nut 36 which may be removably threaded onto the exposed threads 37 of the axle. The threaded shaft portion 38 of a cap screw 39 is inserted through the opening 17 or 18 in the bent end 15 or 16 and threaded into the extended end of the lock nut 36. The cap portion 40 of the screw 39, being larger in diameter than the opposing flat sides of the hexagonal opening 17 or 18, retains the stand on the lock nut 36. It would be obvious to those skilled in the art to alternatively provide small holes in the bent portions 15 or 16 to receive a cap screw or other fastener means.

OPERATION

To use the removable and foldable stand 10, the plug 32 is pressed and the stand 10 is unfolded to its extended position. The hexagonal opening 17 or 18 in one of the bent ends 15 or 16 is placed over the axle nut 19 of the rear bicycle wheel 20, and the bicycle is leaned over until the other end of the stand firmly supports the bicycle in the angular position. To remove the stand 10, the rider simply stands the bicycle upright and slides the hexagonal opening off of the nut 19. The plug 32 is then pushed and the two members 11 and 12 are pivoted into the nested folded position (FIG. 5). The stand 10 is thus folded compactly and may be carried in the pocket of the rider, or may be conveniently stored in a small tool kit or box.

Alternatively, the stand 10 may be attached to the axle of the rear wheel 20 by threading the rotatable lock nut 36 (FIG. 6) onto the exposed threads 37 of the axle. The stand 10 is opened to a straight in-line position with the lock nut 36 secured tightly on bent portion 15 by the capscrew 39. The stand 10 is then used as a handle to rotate lock nut 36 to secure the same on the threads 37 of the bicycle axle. If the lock nut 36 reaches a tightened position with the stand 10 and an improper angle for supporting the bicycle, the stand can be moved further and will slip relative to the lock nut 36 until the proper position is reached. To remove the stand, the rider simply turns the stand 10 to unscrew the lock nut 36 from threaded axle 37.

While this invention has been described fully and completely with special emphasis upon a preferred embodiment, it should be understood that within the scope of the appended claims the invention may be practiced otherwise than as specifically described herein.

I claim:

1. A stand releasably attached to the end of the rear axle portion of a bicycle in a fixed position and extending at a small angle from the vertical to support the bicycle in a near vertical position, including
    means fitting over the end of the rear axle portion of a bicycle to secure said stand in said fixed position having an end portion with a hexagonal opening therein to fit releasably over the axle nut of the bicycle wheel with a supporting portion extending at an angle thereto.

2. A stand according to claim 1 in which
    said means fitting over the rear axle of a bicycle comprises
    first and second support members, and
    means for pivotally connecting said first and second support members and allowing relative movement therebetween from a first extended position to a second folded and nested position, said hexagonal opening being in the end of one of said support members opposite said connecting means.

3. A stand according to claim 2 further including
    means on one of said support members for locking the same in said first extended position or in said second folded and nested position.

4. A stand according to claim 3 in which
    said first and second support members comprise elongated rectangular plate members each having a flat body portion and an angularly bent end portion.

5. A stand according to claim 4 in which
    said pivotal attaching means comprises a pivot pin securing together one end of said first and second members whereby when said members are folded to their nested position, the folded length is approximately one half that of the extended position.

6. A stand according to claim 4 in which
    said support members are formed of a light density metal.

7. A stand according to claim 4 in which
    said support members are formed of aluminum.

8. A stand according to claim 4 in which
    said flat straight portions are provided with longitudinally spaced openings.

9. A stand according to claim 8 in which
    one of said support members has a cylindrical recess adjacent one end thereof,
    said push button latch mechanism comprises
    a circular plug loosely fitted into said recess,
    a spring positioned in said recess biasing said plug outward,
    said plug having a cylindrical portion of smaller diameter of a size fitting said openings therein,
    said plug being movable to a position fitting one opening on the other member when said members are in the extended position to secure the same in such position,
    said plug being movable to a position fitting another opening on said other member when said members are in the folded nested position to secure the same in such position, and said plug being depressable against said spring to a point clearing the surface of said other member to permit movement of said members between said folded and said extended positions.

10. A stand according to claim 4 in which
said support members are formed of a light density metal, and
said flat straight portions are provided with longitudinally spaced openings.

11. A stand according to claim 4 in which
said support members are formed of aluminum, and
said flat straight portions are provided with longitudinally spaced openings.

12. A stand according to claim 4 in which
said locking means comprises a push button latch mechanism.

13. A stand releasably attached to the end of the rear axle portion of a bicycle in a fixed position and extending at a small angle from the vertical to support the bicycle in a near vertical position, including means releasably fitting over the end of the rear axle portion of a bicycle to secure said stand in said fixed position, comprising first and second support members in the form of elongated rectangular plate members each having a flat body portion and an angularly bent end portion, means for pivotally connecting said first and second support members and allowing relative movement therebetween from a first extended position to a second folded and nested position, means on one of said support members for locking the same in said first extended position or in said second folded and nested position, said releasably-fitting means comprises a hexagonal opening disposed in at least one of said bent end portions to fit snugly over the axle nut of the bicycle wheel.

14. A stand releasably attached to the end of the rear axle portion of a bicycle in a fixed position and extending at a small angle from the vertical to support the bicycle in a near vertical position, including means releasably fitting over the end of the rear axle portion of a bicycle to secure said stand in said fixed position, comprising first and second support members in the form of elongated rectangular plate members each having a flat body portion and an angularly bent end portion, means for pivotally connecting said first and second support members and allowing relative movement therebetween from a first extended position to a second folded and nested position, means on one of said support members for locking the same in said first extended position or in said second folded and nested position, at least one of said bent ends having an opening therein, said releasably attaching means comprises
a nut having one end supported on said bent end adjacent to said opening and being threadable onto the exposed threaded end of said axle,
a cap screw having a threaded portion smaller in diameter than said opening and a cap portion larger in diameter than said opening,
said threaded portion extending through said opening and threadedly secured in the extended end of said nut to secure the same tightly on said bent end portion, and
said nut being threadable onto the threaded end of said bicycle axle by rotation of said support members when in said extended position.

15. A stand releasably attached to the end of the rear axle portion of a bicycle in a fixed position and extending at a small angle from the vertical to support the bicycle in a near vertical position, said stand comprises
a first and second support member comprising elongated rectangular members each having a flat portion provided with longitudinally spaced apart circular openings and an angularly bent end portion, means for pivotally connecting said first and second members and allowing relative movement therebetween from a first extended position to a second folded and nested position, said pivotal connecting means comprising a pivot pin disposed longitudinally from each end of said first and second members whereby when said members are folded to their nested position, the folded length is approximately one half that of the extended position, means disposed on at least one of said support members for releasably attaching said stand to said rear axle portion, means on one of said support members comprising a push button latch mechanism for locking the same in said first extended position or in said second folded and nested position, said releasably-attaching means comprising a hexagonal opening disposed in at least one of said bent end portions to snugly fit the axle nut of the bicycle wheel.

16. A stand releasably attached to the end of the rear axle portion of a bicycle in a fixed position and extending at a small angle from the vertical to support the bicycle in a near vertical position, said stand comprises
a first and second support member comprising elongated rectangular members each having a flat portion provided with longitudinally spaced apart circular openings and an angularly bent end portion, means for pivotally connecting said first and second members and allowing relative movement therebetween from a first extended position to a second folded and nested position, said pivotal connecting means comprising a pivot pin disposed longitudinally from each end of said first and second members whereby when said members are folded to their nested position, the folded length is approximately one half that of the extended position, means disposed on at least one of said support members for releasably attaching said stand to said rear axle portion, means on one of said support members comprising a push button latch mechanism for locking the same in said first extended position or in said second folded and nested position, said releasably-attaching means comprising
a nut having one end supported on said bent end adjacent to said opening and being threadable onto the exposed threaded end of said axle, a cap screw having a threaded portion smaller in diameter than said opening and a cap portion larger in diameter than said opening, said threaded portion extending through said opening and threadedly secured in the extended end of said nut to secure the same tightly on said bent end portion, and said nut being threadable onto the threaded end of said bicycle axle by rotation of said support members when in said extended position.

17. A stand releasably attached to the end of the rear axle portion of a bicycle in a fixed position and extending at a small angle from the vertical to support the bicycle in a near vertical position, said stand comprises a first and second support member comprising elongated rectangular members each having a flat portion provided with longitudinally spaced apart circular openings and an angularly bent end portion, means for pivotally connecting said first and second members and allowing relative movement therebetween from a first extended position to a second folded and nested position, said pivotal connecting means comprising a pivot pin disposed longitudinally from each end of said first and second members whereby when said members are folded to their nested position, the folded length is approximately one half that of the extended position, means disposed on at least one of said support members for releasably attaching said stand to said rear axle portion, means on one of said support members comprising a push button latch mechanism for locking the same in said first extended position or in said second folded and nested position, said push button latch mechanism comprising a circular plug press fitted into a circular opening disposed near one the end of one of said flat straight portions, a resilient spring steel strip secured at one end to the plug and its other end extending longitudinally therefrom along the said flat straight portion, a circular button of elastomeric material secured to the extended other end of said strip, said button being slidably disposed within another opening on the same member and a circumferentially aligned opening on said other member when said members are in the extended position to prevent sideward movement therebetween, and said button being slidably disposed within another opening on said other member when said members are in the folded nested position to prevent sideward movement therebetween.

* * * * *